Fig. 3.

Patented Mar. 16, 1926.

1,577,333

UNITED STATES PATENT OFFICE.

ERIC R. LUNDIUS, OF BROOKLYN, NEW YORK, ASSIGNOR TO WESTERN ELECTRIC COMPANY, INCORPORATED, OF NEW YORK, N. Y., A CORPORATION OF NEW YORK.

TESTING SYSTEM.

Application filed January 6, 1923. Serial No. 610,973.

*To all whom it may concern:*

Be it known that I, ERIC R. LUNDIUS, a citizen of the United States, residing at Brooklyn, in the county of Kings, State of New York, have invented certain new and useful Improvements in Testing Systems, of which the following is a full, clear, concise, and exact description.

This invention relates to testing systems, and more particularly, to circuit arrangements for testing subscriber's lines terminating in machine switching central offices.

An object of the invention is to enable an operator at a test desk to build up, by means of machine switching apparatus, a connection to a subscriber's line of a machine switching central office and, thereafter conduct routine and special tests on said line and substation apparatus thereat.

One feature of the invention consists in providing a test circuit with means controlled by the actuation of a single key for automatically placing a sender in operative relationship with either end of the test circuit.

Another feature of the invention resides in the provision of means, in a circuit having means for extending a connection over either end thereof, for invariably connecting the sender to the end of the circuit first extended.

Another feature of the invention consists in the provision of means in a system of this nature for invariably connecting the sender to the end of the circuit first extended and for thereafter connecting the sender to the other end of the circuit.

The invention may be more readily understood by reference to the following description considered in connection with the accompanying drawings in which Figs. 2, 3, 4 and 5 show circuits of the test desk for conducting various tests on the subscriber's line. Fig. 1 shows in full a trunk circuit terminationg at one end in a jack located at the test desk and at the other end in the selector switch and schematically, a final selector switch. The station of a line terminating in a machine switching office is also shown.

*Description of apparatus.*

Figures 1, 6:
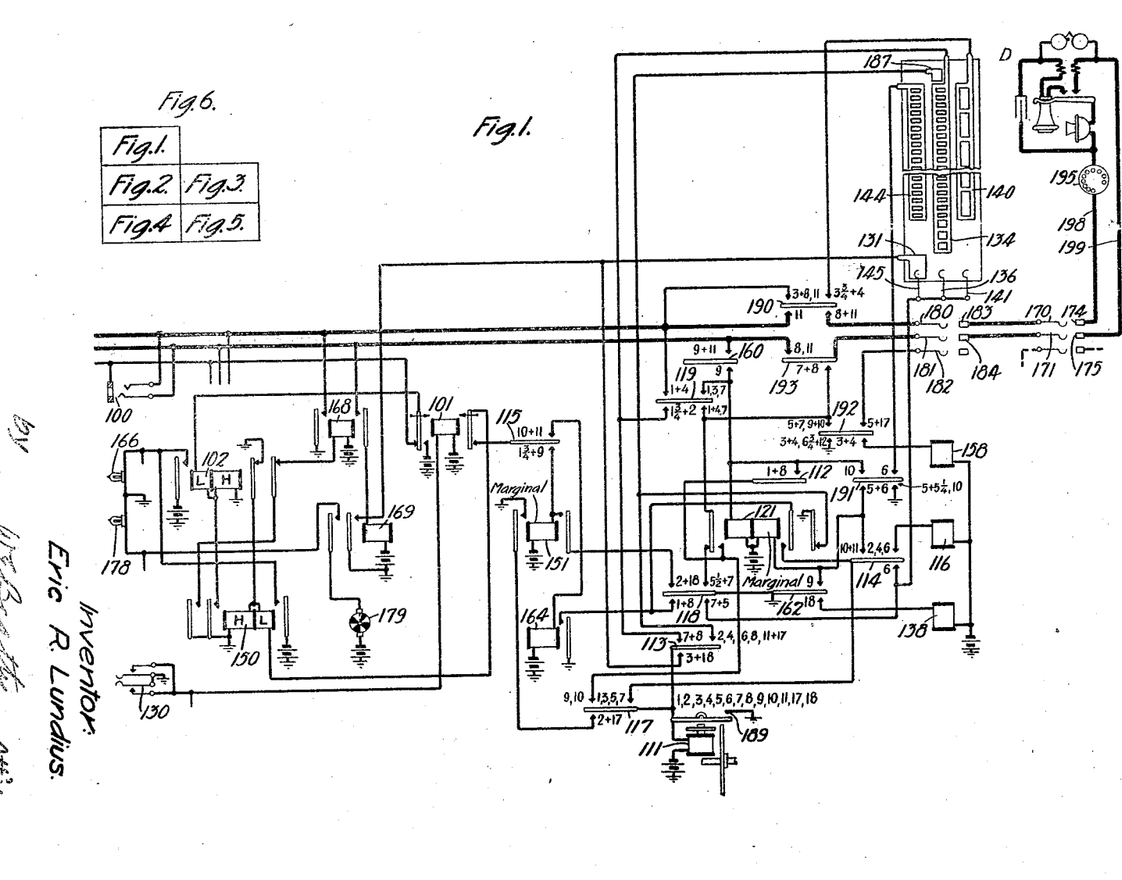
Fig. 1 shows partly schematically and partly in full, machine switching mechanism for establishing a connection with a subscriber's line terminating in a machine switching central office
Fig. 6 is a diagram showing the manner in which the several sheets of the drawing should be arranged to show as much of a complete organization of circuits as is necessary to illustrate the manner in which various tests of the subscribers' lines may be made.

The test selector and final selector indicated in Fig. 1 of the drawings may be of the type shown and described in the patent to E. B. Craft and J. N. Reynolds, No. 1,123,696, issued January 5, 1915. The switches of this type have a vertically disposed switch shaft (not shown) provided with five sets of brushes, each brush having access to a bank of one hundred terminals. For driving the brushes upwardly an updrive magnet is provided which, when energized, presses the switch shaft against a constantly driven power drum, and for restoring the drum to normal position a second downdrive magnet is provided which, when energized, presses the switch shaft against a second constantly driven power drum. For determining the particular set of brushes on the switch shaft to be employed, tripping spindle (not shown) is provided as described in the patent heretofore referred to. The final selector switch schematically indicated may be of the well known power driven type as, for example, as shown in Patent No. 1,395,977 of November 1, 1921, to Stearn, et al.

For controlling the circuits associated with the several selector switches and the circuits of the sender, auxiliary switches are provided. These switches may be of the type described in the patent to Reynolds, et al, 1,127,808, filed February 9, 1915, and known in the art as sequence switches. Each sequence switch comprises a rotatable shaft driven from a constantly operated source of power through a magnetic clutch member and carries a plurality of circuit closing cams, which at different positions of the shaft cause the closure of a plurality of contacts. The cam contacts associated with each sequence switch are closed only in the positions indicated by the numerals associated with each contact with the exception of the master contacts 189 and 389 associated, respectively, with sequence switches 111 and 360, these latter contacts being opened in the positions indicated by the numerals appearing adjacent such contacts and closed in all other positions. The testing equipment shown in Figs. 2, 3, 4 and 5 of the drawings is for the purpose of enabling the operator to conduct routine and special tests on any subscriber's line terminating in the machine switching central office. The routine tests are required, generally, to ascertain where the subscribers' lines are devoid of "shorts", "grounds" and crosses with the central office battery or foreign E. M. F., that the capacity of the lines is correct and that the insulation resistance of the lines is satisfactory. Among other devices employed in making such tests are a test battery comprising batteries B and B', a volt milliammeter and various keys. Among the special tests conducted by the testing operator are the tests hereinafter termed "howler" test, sounder test and adjustment of subscribers' bells. The test circuit terminates in a primary test cord at one end and in a secondary test cord at the other end. The testing devices may be associated with either one of these test cords. Associated with the primary test cord are those devices which are necessary for making the routine tests and certain other tests inseparably associated with the use of a volt-milliammeter. Associated with the secondary test cord are those testing devices which do not involve the use of a volt-milliammeter. By means of a test circuit interchange key 404, the primary and secondary test circuits can be interchanged with respect to their plugs. This arrangement enables the testing operator to employ his time more efficiently since those tests, such as howler, sender and adjustment of subscribers' bells, which are apt to consume considerable time are normally associated with the secondary test circuit, whereas, the apparatus for making the routine tests are normally associated with the primary test circuit. This arrangement also enables the testing operator to make routine tests on one line connected to the primary test circuit and to conduct special tests on another line connected to the secondary test circuit at the same time.

Figure 4:
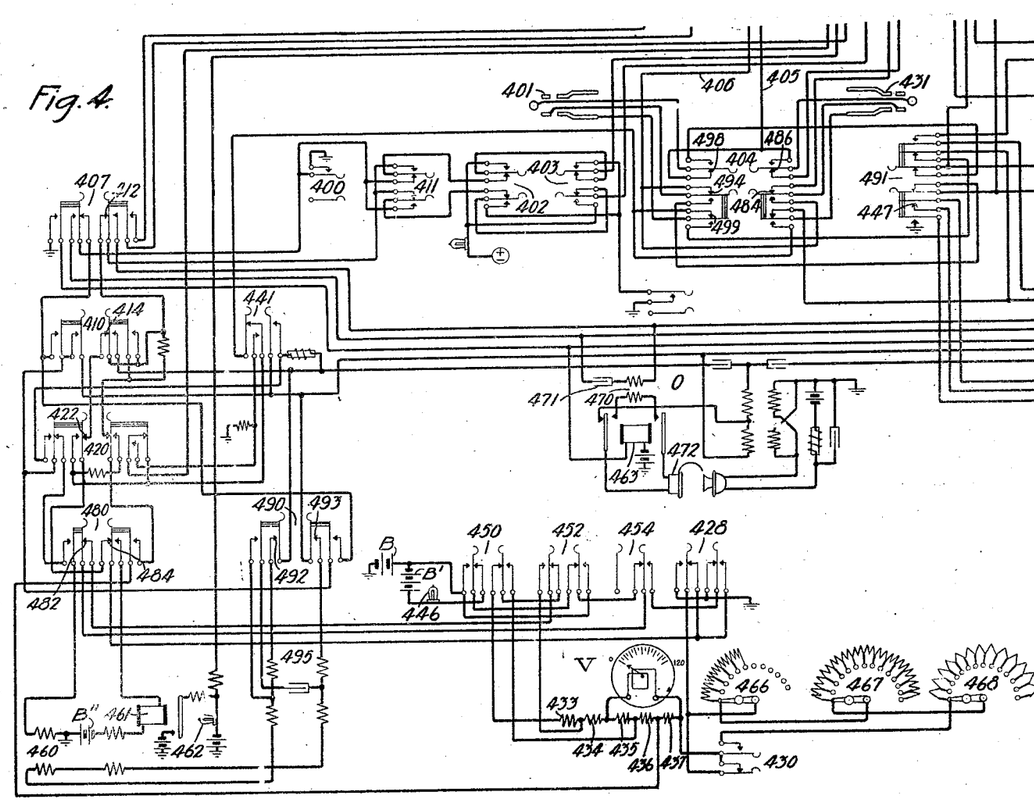
Figs. 4 and 5 show various keys of the test circuit which are under the control of the operator at the test desk, a pair of plugs for connecting the test circuit to the trunk circuit, a voltmeter, a variable rheostat, an operator's telephone set and howler and ringing equipment.

The testing combination intended primarily for determining the character of the trouble consists of a voltmilliammeter and a 100 volt battery poled opposite to the central office battery having a 20 volt tap. In Fig. 4 of the drawings the 100 volt battery includes the batteries B and B', the former being the 20 volt tap. The voltmilliammeter has the following scales: 0 to 120 volts—100,000 ohms, 0 to 24 volts—20,000 ohms, 0 to 24 volts—1000 ohms (also reading 0 to .024 amperes) and 0 to .480 amperes. The 100 volt test battery is used in connection with the 100,000 ohm 120 volt scale, while a tap from this battery to give 20 volts is used with the 20,000 ohm 24 volt scale and the 1000 ohm 24 volt scale. The milliammeter is used in connection with the central office battery when making resistance measurements. By having the full scale deflection of the volt milliammeter register 120 volts and by having the test battery poled opposite to the central office battery, the testing operator is enabled to quickly detect crosses with the latter battery in that the reading will be in excess of 100 volts by an amount equal to the voltage of the central office battery, assuming that the voltage of the central office battery does not exceed 20 volts. If the voltage of the central office battery is in excess of 20 volts there will be an over throw of the needle.

The howler apparatus includes a step-by-step switch 560 for varying the number of turns in the secondary circuit of an induction coil 534 which coil has connected to its primary an interrupter 535.

Figure 5:
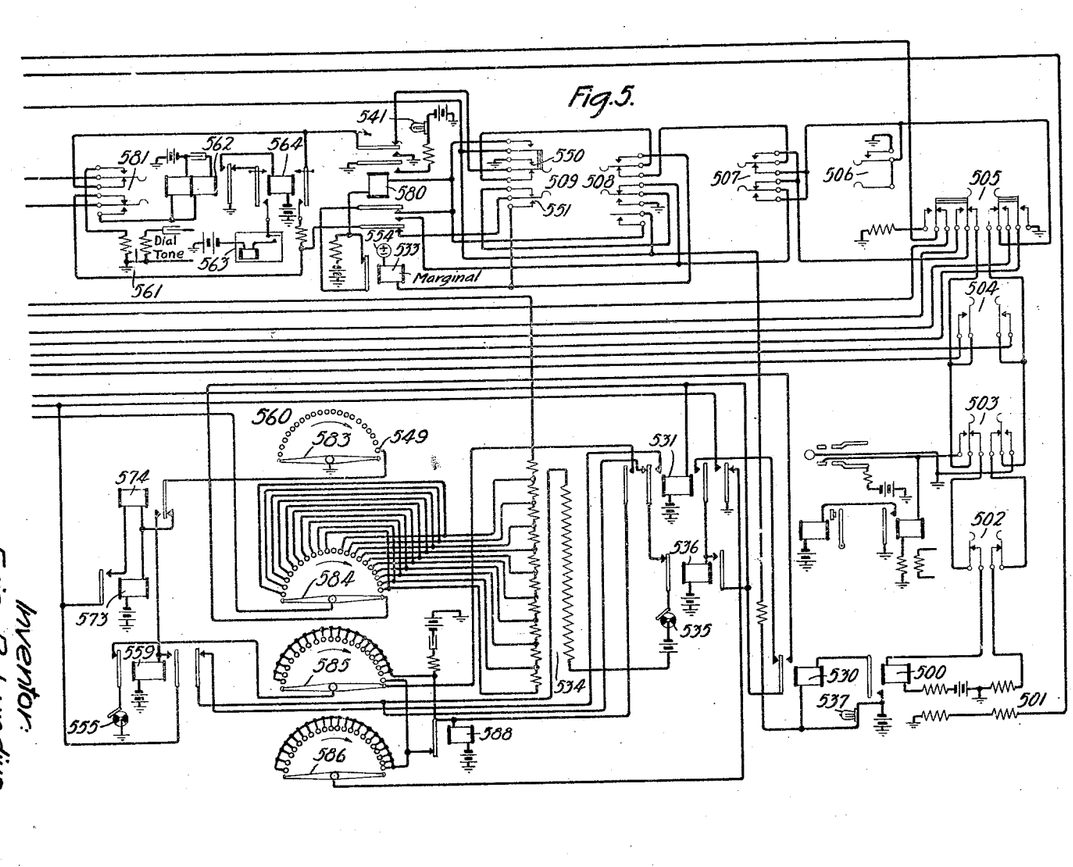

For testing the dials at the substation, a dial tester is schematically shown within the rectangle in the upper left-hand part of Fig. 5 of the drawings. This apparatus may be of the type shown and described in Patent No. 1,391,947 of September 27, 1921, to E. W. Gent.

*Description of operation.*

The testing operator may conduct a test either over the primary test cord terminating in plug 401 or over the secondary test cord terminating in plug 431. Insertion of either of these plugs into a jack 100 of the trunk circuit terminating in a selector switch, actuation of the digit keys corresponding to the number desired, and actuation of start key 205 causes the connection of the sender to the plug taken for use.

Let it be assumed that the testing operator desires to test the line of the subscriber D whose number is 9532. If the primary test cord is to be employed in the test, the testing operator will insert plug 401 into jack 100 of the selector circuit and then record the number of the line to be tested upon the keyboard. Actuation of any one of the keys of the thousands, hundreds, tens and units keys closes their associated circuits 211 to 214, respectively, thereby operating their associated relays 207 to 210, respectively. The digit keys and the start key 205 are of the well known mechanically locking and electrically releasing type. After recording the number the operator depresses start key 205 whereupon a circuit is completed extending from grounded battery, through the left-hand windings of relay 121, upper right-hand contact of sequence switch spring 119 (1), upper left-hand contact of said spring (1+4), tips of jack 100 and plug 401, contacts 498 of key 404, conductor 405, lower inner normal contacts of relay 203, winding of relay 399, lower contact of sequence switch spring 398 (1+2), inner left-hand normal contacts of relay 397, lower left-hand contacts of sequence switch spring 396 (1+11), upper right-hand contacts of said spring (1+2), winding of relay 371, normal contacts of relay 310 and inner right-hand normal contacts of relay 395 to ground. Relay 399 operates in this circuit but due to the high resistance of the winding of this relay, the line relay 121 of the selector circuit and the stepping relay 371 in series therewith are not energized at this time. Insertion of plug 401 into jack 100 also completes a circuit extending from ground through the right and left-hand windings of relay 102, left-hand normal contacts of relay 101, sleeves of jack 100 and plug 401, contacts 499 of key 404, left-hand normal contacts of key 441, outer right-hand normal contacts of key 420, winding of relay 203 and outer left-hand normal contacts of relay 590 to grounded battery. Relay 102 operates in this circuit but due to the high resistance of the right-hand winding of relay 102, relay 203 does not operate. Relay 102 in attracting its left-hand armature completes an obvious circuit for lamp 166. Lamp 166 in lighting serves as a busy signal. Relay 399, in operating, due to the insertion of plug 401 into jack 100 completes a circuit for relay 390 over a path extending from grounded battery, through the upper left-hand contacts of sequence switch spring 391 (1+17), winding of relay 390, contacts of relay 399, the left-hand contacts of either of the relays 207, 208, 209 or 210, contacts of key 205 and left-hand contacts of sequence switch spring 290 (1) to ground. Relay 390 operates in this circuit and in attracting its outer right-hand armature locks over an obvious circuit to grounded battery at the sequence switch spring 391. Relay 390 in attracting its outer left-hand armature opens the circuit previously traced for relay 203 and causes the operation of relay 341 over a circuit extending from grounded battery, through the outer left-hand alternate contacts of relay 390, winding of relay 341, outer right-hand normal contacts of key 420 and thence to ground at the winding of relay 102 over the path previously traced. Relay 390 in attracting its outer right-hand armature also completes an obvious circuit for lamp signal 380 and for relay 204. Lamp 380 is associated with the primary test cord and the lighting thereof indicates to the operator that the sender will be connected to that cord. Relay 204 operates in the circuit just traced and completes a circuit for moving sequence switch 360 out of position 1 and into position 2, said circuit extending over a path from grounded battery, through magnet winding of sequence switch 360, upper right-hand contact of sequence switch spring 367 (1) and lower alternate contacts of relay 204 to ground. When sequence switch 360 arrives in position 2, the sender is connected in operative relationship with the selector switch and the sender pilot lamp is flashed over a circuit extending from grounded battery, through interrupter 281, upper alternately contacts of relay 204, lamp 382, and lower right-hand contact of sequence switch spring 365 (2+10) to ground. Lamp 382 flashes during the time that the sender is connected to the test cord.

When sequence switch 360 reaches position 2 the winding of relay 399 is short circuited at the contacts of sequence switch spring 398, whereupon the stepping relay 371 and the line relay 121 are energized in the fundamental circuit. Relay 121 upon energizing closes a circuit for driving sequence switch 111 out of position 1 and into position 2. This circuit extends from grounded battery, through the magnet winding of sequence switch 111, upper right-hand contact of sequence switch spring 117 (1), inner right-hand contacts of relay 121 and lower left-hand contact of sequence switch spring 118 (1+8) to ground. As soon as sequence switch 111 leaves position 1 the initial energizing circuit for relay 121 is opened at the upper right-hand contact of sequence switch spring 119 but relay 121 remains energized over the fundamental circuit through a locking branch of the fundamental circuit which may be traced from grounded battery, through the left-hand winding of relay 121, contacts of sequence switch spring 112, left-hand alternate contacts of relay 121, lower right-hand contacts of sequence switch spring 119 and thence over the fundamental circuit as previously traced. As the sequence switch 111 passed through position 1¾ relay 150 operated over a circuit extending from ground, through the left and right-hand windings of relay 150, right-hand normal contacts of relay 101, lower right-hand contact of sequence switch spring 115 (1¾+9) and winding of relay 151 to grounded battery. Relay 151 is marginal and does not operate in series with the left-hand winding of relay 150, which is of high resistance. Relay 150 in attracting its right-hand armature transfers the control of lamp 166 from relay 102 to relay 150 and in attracting its inner left-hand armature places a shunt around the right-hand high resistance winding of relay 102. The purpose of placing the busy lamp under control of relay 150 is to enable the tester to temporarily withdraw the plug from jack 100 and still maintain the busy lamp lighted when the sequence switch 111 is in its testing position. The reason for the shunting of the high resistance winding 102 will be explained hereafter.

With the selector sequence switch 111 in position 2, a circuit is now closed for the updrive magnet 116 which circuit extends from grounded battery, through the winding of magnet 116, upper right-hand contact of sequence switch spring 114 (2), inner right-hand contacts of relay 121 and lower left-hand contacts of sequence switch spring 118 (1+8) to ground. Magnet 116, upon energizing, causes the upward movement of the brushes of the switch in the manner well known in the art.

During the upward movement of the brushes of the selector switch ground potential is intermittently connected to the fundamental circuit at a junction point between the winding of stepping relay 371 of the sender and the winding of line relay 121 of the selector. This ground potential is connected to the junction point at sequence switch spring 119 (1¾+2) through brush selection segment 134, brush 136 and the lower right-hand contact of sequence switch 118 (7+5). The application of this intermediate ground potential to the fundamental circuit has no effect upon the energization of relay 121 of the selector but causes the intermittent deenergization of the stepping relay 371 in synchronism with the upward movement of the brushes of the selector. With the sender sequence switch 360 in position 2 and relay 371 energized over the fundamental circuit as previously traced through the winding of relay 121 of the selector switch and with the thousands digit key No. 9 depressed, a circuit is closed upon the first energization of stepping relay 371 for the No. 4 counting relay 304, this circuit extending from grounded battery, through the winding of the lower No. 4 counting relay 304, back contact and armature of the upper No. 4 counting relay 314, lead 324, lead 324 Fig 2 connected to the No. 9 key of the thousands set of keys, left-hand contacts of said key, upper left-hand contact of sequence switch 241 (2), contact of stepping relay 371, lower left-hand contact of sequence switch spring 365 to ground. Counting relay 304, upon energizing, closes a locking circuit for itself extending through the winding of the upper counting relay 314, the contacts of relay 304, and the upper right-hand contact of sequence switch spring 366 (2) to ground. The upper counting relay 314 does not energize at this time since its winding is shunted by ground connected through the armature and contact of stepping relay 371. Relay 314 becomes energized in this locking circuit as soon as stepping relay 371 deenergizes upon the first upward setting of the brushes of the selector switch.

Upon the first deenergization of relay 371 through the first connection of ground to the junction point 119 of the fundamental circuit by the commutator brush 136, relay 314 energizes transferring the connection of the control lead 324 from the winding of the lower No. 4 counting relay 304 to the winding of the lower No. 3 counting relay 303, this transferred circuit extending from the lead 324 through the armature and front contact of the upper No. 4 counting relay 314, the armature and back contact of the upper No. 3 counting relay 313 and thence to grounded battery through the lower No. 3 counting relay 303 whereupon relay 303 is operated. Upon the second deenergization of stepping relay 371, the upper No. 3 counting relay 313 becomes energized and transfers the connection from control lead 324 to the lower No. 2 counting relay 302. In response to the next deenergization of the stepping relay 371, the upper No. 2 counting relay 312 becomes energized and transfers the connection from control lead 324 to the lower No. 1 counting relay 301. Upon the next deenergization of stepping relay 371, the No. 1 counting relay 311 becomes energized and transfers the connection from control lead 324 to the lower No. 0 counting relay 300, and in response to the next deenergization of stepping relay 371 the upper No. 0 stepping relay 310 is energized, closing a circuit for driving the sequence switch 360 out of position 2 and into position 4. This circuit may be traced from grounded battery, through the magnet winding of sequence switch 360, through the lower right-hand contact of sequence switch spring 367 (2), front contact and armature of the upper No. 0 counting relay 310 and inner left-hand normal contacts of relay 395 to ground. Sequence switch 360 upon leaving position 2 opens the locking circuit of all counting relays which have been locked up, at the upper right-hand contact of sequence switch spring 366 (2).

At the time that counting relay 310 energized upon completion of group selection by the selector switch, relay 121 deenergized due to the opening of the fundamental circuit at the normal contacts of relay 310. This relay, upon deenergizing, opens the previously traced circuit through the updrive magnet 116 thereby arresting the upward movement of the brushes. At its outer right-hand armature and back contact relay 121 closes a circuit extending from grounded battery, through the magnet winding of sequence switch 111, upper right-hand contact of sequence switch spring 113 (2) and back contact and outer right-hand armature of relay 121 to ground, for driving sequence switch 111 out of position 2 and into position 3. Upon reaching position 3 sequence switch 111 closes a circuit for the trip magnet 158, extending from grounded battery through the winding of magnet 158, and thence to ground through the lower right and left-hand contacts of sequence switch spring 192 (3+4). Trip magnet 158 upon energizing, rotates the tripping spindle (not shown) in the manner well known, into such a position as will trip the selected set of brushes upon the subsequent upward movement of the switch shaft. In position 3 relay 121 and stepping relay 371 are again energized over a circuit extending from grounded battery, through the left-hand winding of relay 121, upper right-hand contact of sequence switch spring 119 (3), upper left-hand contact of said spring (1+4), tip of jack 100 and plug 401, contacts 498 of key 404, conductor 405, inner lower normal contacts of relay 203, upper contact of sequence switch spring 398 (2+11), inner left-hand normal contacts of relay 397, lower left-hand contacts of sequence switch spring 396 (1+11), upper right-hand contact of said spring (4), winding of stepping relay 371, normal contacts of the upper No. 0 counting relay 310 and inner right-hand normal contacts of relay 395, to ground. Relay 121 in operating closes a circuit for driving sequence switch 111 out of position 3 and into position 4, said circuit extending over a path including grounded battery, magnet winding of sequence switch 111, upper right-hand contact of sequence switch spring 117 (3), inner right-hand contacts of relay 121 and ground at the lower left-hand contact of sequence switch 118 (1+8). Relay 121 in operating also closes the locking circuit previously traced for holding itself energized over the fundamental circuit after sequence switch 111 leaves position 3. With sequence switch 111 in position 4 and relay 121 energized, the circuit previously traced through the updrive magnet 116 is again closed and the brushes of the switch are again driven upwardly. During the initial upward driving of the brushes the fifth set of brushes is tripped by a tripping spindle in the manner well known and during the subsequent upward movement of the switch shaft the tripped set of brushes travel in engagement with the terminals of the bank with which they are associated.

During the upward movement of the switch shaft an intermittent ground is connected to the junction point in the fundamental circuit between the winding of relay 121 and the sender stepping relay 371 over a circuit extending from sequence switch spring (119) through the upper left-hand contact of sequence switch spring 190 (3+8), upper right-hand contact of said spring 33/4+4), through group selection segment 140, brush 141 and thence to ground through the lower right-hand contact of sequence switch 118 (7+5).

Figure 2:
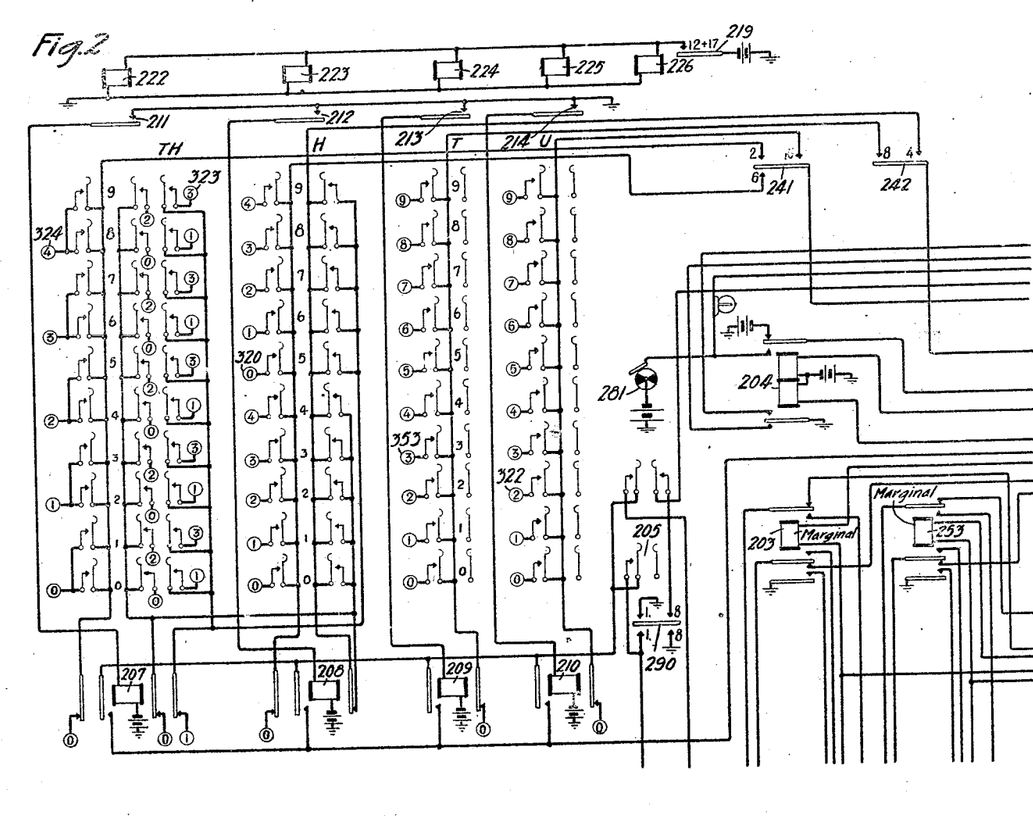
Fig. 2 shows an operator's keyboard comprising a plurality of sets of digit keys for recording the numbers of subscribers' lines to be tested.
Figure 3:
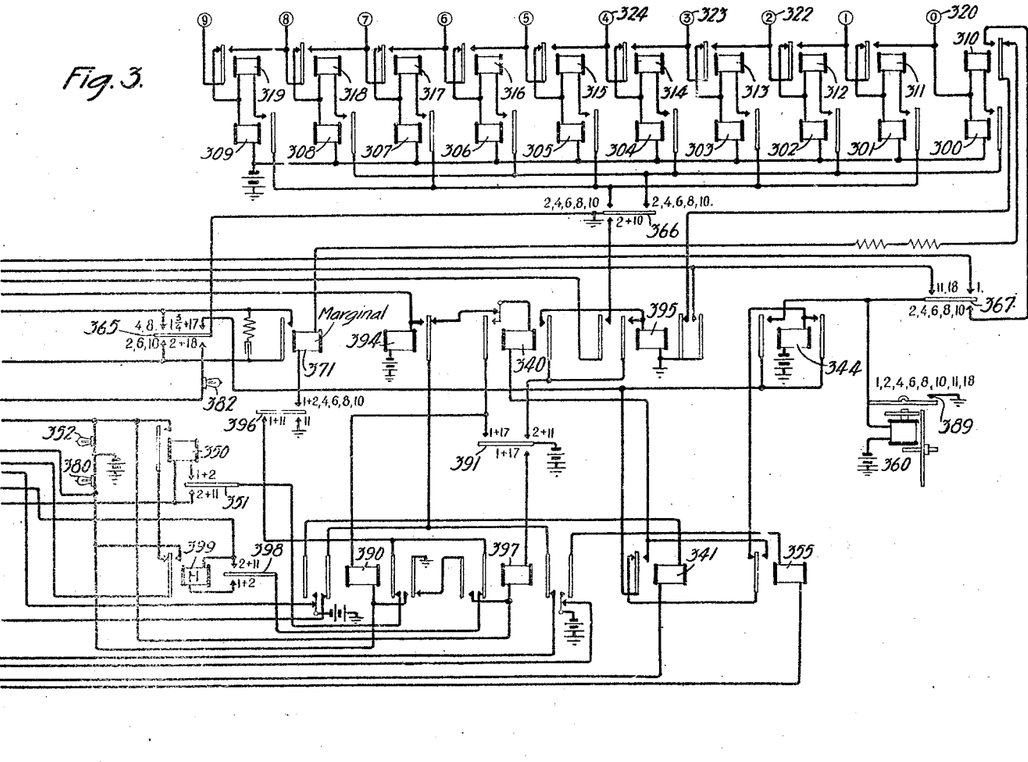
Fig. 3 shows a portion of a cricuit of a sending mechanism comprising a stepping relay, a group of counting relays and a sequence switch for controlling circuits of the sender.

The energization of the sender stepping relay 371, with sequence switch 360 in position 4, closes a circuit through the No. 3 counting relay 303, assuming that the testing operator has recorded the second digit No. 5, which may be traced from grounded battery, through the winding of the lower No. 3 counting relay 303, back contact and armature of the upper No. 3 counting relay 313, lead 323, and thence to lead 323 Fig. 2, outer right-hand contacts of the No. 9 thousands key, right-hand contacts of the No. 5 hundreds key, right-hand contact of sequence switch spring 242 (4), contacts of stepping relay 371 and upper left-hand contact of sequence switch spring 365 (4) to ground. Counting relay 303 energizes in this circuit and locks up, in the manner previously described, through the winding of counting relay 313, which relay 313 energizes at the first deenergization of stepping relay 371. In the well known manner, counting relays 302, 301 and 300 are successively energized, and when the upper No. 0 counting relay 310 is energized upon the fourth deenergization of stepping relay 371 or at the time the tripped set of brushes at the selector switch have been positioned upon the first set of terminals of the fourth group of terminals in the bank to which they have access, it closes a circuit at its armature and front contact for driving the sequence switch 360 out of position 4 and into position 6. This circuit may be traced from grounded battery, through the magnet winding of sequence switch 360, lower right-hand contact of sequence switch spring 367 (4), front contact and armature of relay 310 and inner right-hand normal contacts of relay 395 to ground.

At the time counting relay 310 energizes upon the completion of group selection at the selector switch the fundamental circuit extending through line relay 121 of the selector switch is opened causing the deenergization of said relay 121. This relay, upon deenergizing, opens the circuit previously traced through the updrive magnet 116 thereby arresting the upward movement of the brushes of the switch. At its outer right-hand armature and back contact, relay 121 closes a circuit extending through the magnet winding of sequence switch 111 and the upper right-hand contact of sequence switch spring 113 (4) for driving the sequence switch out of position 4 and into position 5. In position 5 relay 121 is again energized by a circuit extending from grounded battery, through its right-hand winding, lower left-hand contact of sequence switch spring 191 (5+6) and lower right-hand contact of said spring (5+5¼) to ground. Relay 121 now closes a circuit extending through the magnet winding of sequence switch 111, upper right-hand contact of sequence switch spring 117 (5), inner right-hand contacts of relay 121, lower left-hand contact of sequence switch spring 118 (1+8) to ground, for driving sequence switch 111 out of position 5 and into position 6. Upon leaving position 5¼ the energizing circuit extending through the winding of relay 121 and sequence switch spring 191 is opened at sequence switch spring 191 (5+5¼) but relay 121 remains energized over a locking circuit extending from grounded battery through the left-hand winding of relay 121, contact of sequence switch spring 112 (1+8), front contact and left-hand armature of relay 121, upper left-hand contact of sequence switch spring 192 (5+7), upper right-hand contact of said spring (5+17), and thence through the test brush 182 to ground on the test terminal of the first trunk of the group to which the brush set has been moved, during group selection movement of the brushes, if the first trunk of the group is at the time busy.

When sequence switch 111 reaches its position 6, a circuit is closed for the updrive magnet 116 over the path previously traced for driving the brushes of the switch upwardly in their trunk hunting movement. This movement will continue so long as the test brush 182 encounters ground potential on the test terminals of the trunks of the group over which this selector moves. When, however, an idle trunk is found which it will be assumed is the trunk disclosed, the locking circuit of relay 121 will be opened and since the initial energizing circuit of the relay 121 was opened as soon as the sequence switch moved out of position 5¼, relay 121 will deenergize thereby opening at its inner right-hand armature and front contact the circuit of the updrive magnet 116. To insure, however, that the brushes shall be properly centered on the terminals of the selected idle trunk, relay 121 is maintained energized to maintain the circuit of the updrive magnet 116 until the brushes are so centered by an additional locking circuit extending from grounded battery, through the right-hand winding of relay 121, lower left-hand contact of sequence switch 191 (5+6), upper right-hand contact of said spring (6), commutator segment 144, brush 145, lower right-hand contact of sequence switch spring 118 (7+5) to ground. It is to be noted that as soon as the brushes of the switch engage an insulating section of the segment 144 corresponding to the first idle trunk, the circuit of relay 121 is opened and this relay immediately deenergizes opening the circuit through the brush 145 and the commutator segment 144 before the brush 145 can engage the conducting portion of commutator segment 144.

Upon the deenergization of relay 121 following the centering of the brushes of the switch upon the terminals of the selected idle trunk, the circuit previously traced is closed for driving the sequence switch 111 out of position 6 and into position 7. In position 7 of sequence switch 111 a circuit is completed from grounded battery, through the left-hand winding of relay 121, upper right-hand contact of sequence switch spring 119 (7), lower right-hand contact of said spring (1+7), lower right-hand contact of sequence switch spring 193 (7+8), brush 181 and terminal 184 and thence over the ring conductor of the final selector switch to ground as shown in the aforesaid Stearn et al patent. Relay 121 in operating completes a circuit for advancing the sequence switch 111 out of position 7 and into position 8, this circuit extending from grounded battery, through the magnet winding of sequence switch 111, upper right-hand contact of sequence switch spring 117 (7), inner right-hand contacts of relay 121, lower left-hand contact of sequence switch spring 118 to ground. The circuit just traced for relay 121 is closed in position 7 of the sequence switch 111 and as soon as relay 121 operates and as long as it is in position 8, a locking circuit for relay 121 is completed over a path extending from grounded battery, through the left-hand winding of relay 121, contact of sequence switch 112 (1+8), left-hand alternate contacts of relay 121, lower right-hand contact of sequence switch spring 193 (7+8) brush 181, terminal 184 and thence to ground (not shown) on the ring conductor of the final selector switch.

In position 8 of sequence switch 111, a fundamental circuit is established from grounded battery, through the line relay (not shown) of the final selector, terminal 183 and brush 180 of the selector switch, lower right-hand contact of sequence switch spring 190 (8+11), upper left-hand contact of said spring, tip of jack 100 and thence over the path previously traced through stepping relay 371 to ground at the inner right-hand contacts of relay 395.

Upon the extension of the fundamental circuit to the final selector switch, a line relay (not shown) of the final selector switch and the stepping relay 371 both energize. Under the control of the depressed keys at the keyboard, the final selector switch is then moved successively in its brush, tens and units selection movement in the manner fully described in the aforementioned patent to Stearn et al. In the brush selection movement, the counting relay 300 is energized over a circuit extending from grounded battery, through the winding of relay 300, lead 320, lead 320, Fig. 2, left-hand contacts of the No. 5 hundreds key, lower left-hand contact of sequence switch spring 241 (6), contacts of stepping relay 371, lower left-hand contact of sequence switch spring 365 (6) to ground. The counting relay 300 in operating, prepares in the well known manner, the circuit for the upper No. 0 counting relay 310. As the brushes of the switch shaft of the final selector are moved upwardly, relay 371 is shunted and allows relay 310 to operate. Relay 310 in operating completes a circuit for sequence switch 360 over a path extending from grounded battery, through the lower right-hand contact of sequence switch spring 367 (6), alternate contacts of relay 310 and inner right-hand contacts of relay 395 to ground, for moving sequence switch 360 out of position 6 and into position 8. The opening of the fundamental circuit at the contacts of counting relay 310 also causes the advancement of the sequence switch of the final selector out of its brush selecting and into its tens selecting position. The fundamental circuit is again closed and the stepping relay 371 again operates over a path similar to that previously described.

With sequence switch 360 in position 8 and the stepping relay 371 energized, a circuit for the No. 3 counting relay 303 is completed over a path extending from grounded battery, through the winding of relay 303, back contact and armature of relay 313, lead 323, lead 353 of Fig. 2, left-hand contacts of the No. 3 tens key, left-hand contact of sequence switch spring 242 (8), contacts of stepping relay 371 and upper left-hand contact of sequence switch spring 361 (8) to ground. Relay 303 in operating, prepares a circuit for the upper No. 3 relay 313. As the brushes of the final selector are moved upwardly, the stepping relay 371 is intermittently shunted and the counting relays energize in succession until the upper No. 0 counting relay 310 is operated. Relay 310, in operating, completes a circuit for sequence switch 360 over a path extending from grounded battery, through the magnet winding of sequence switch 360, lower right-hand contact of sequence switch spring 367 (8), alternate contacts of relay 310 and inner right-hand contacts of relay 395 to ground, for moving the sequence switch 360 out of position 8 and into position 10. The opening of the fundamental circuit at the contacts of relay 310 also causes the advancement of the sequence switch of the final selector out of the tens selection position and into its units selection position. With sequence switch 360 in position 10 and the final selector in its units selection position, the stepping relay 371 is again operated over the fundamental circuit in a manner similar to that previously described.

With the stepping relay 371 energized and sequence switch 360 in position 10, a circuit is closed for the No. 2 counting relay 302 over a path extending from grounded battery, through the winding of counting relay 302, back contact and armature of relay 312, lead 322, lead 322 Fig. 2, left-hand contacts of the No. 2 units key, upper right-hand contact of sequence switch spring 241 (10), contacts of stepping relay 371, lower left contact of sequence switch spring 365 (10) to ground. In response to the successive energizations and deenergizations of relay 371, counting relays 301 and 300 energize in succession and when the upper counting relay 310 energizes, a circuit similar to that previously traced is closed for driving sequence switch 360 out of position 10 and into position 11. Relay 310, upon energizing also opens the fundamental circuit thereby causing the deenergization of the line relay of the final selector switch, whereupon the final selector switch is moved into its testing position.

If the called line is found to be idle, the sequence switch is then moved into its talking position. As the sequence switch associated with the final selector, is moved from its units selection position into its testing position, the circuit previously traced for relay 121 of the test selector is opened due to the removal of ground from the ring conductor at the final selector. Relay 121 of the test selector thereupon deenergizes and closes a circuit for driving sequence switch 111 out of position 8 and into position 9, said circuit extending over a path from grounded battery, through the magnet winding of sequence switch 111, upper right-hand contact of sequence switch 113 (8) and outer right-hand contacts of relay 121 to ground. With sequence switch 111 in position 9, a circuit is closed through the line relay 121 and the ring conductor of the test selector over a path extending from grounded battery, through the left-hand winding of relay 121, lower contact of sequence switch spring 160 (9), upper contact of said spring (9+11), ring of jack 100 and plug 401, contacts 494 of key 404, upper normal contacts of relay 203, inner right-hand normal contacts of relay 397, right-hand normal contacts of relay 394, left-hand normal contacts of relay 340, winding of relay 340, alternate contacts of relay 341, upper right-hand contact of sequence switch spring 365 (13¾+17) to ground. At this time, ground is also connected to the right-hand winding of relay 121 through the upper contact of sequence switch spring 162 (9). Relay 340 operates in the circuit just traced and in attracting its right-hand armature completes a circuit for relay 395 over a path extending from ground, through the winding of relay 395, right-hand contacts of relay 340 and upper right contact of sequence switch spring 391 (2+11) to grounded battery. Relay 395 in attracting its inner left-hand armature, locks to grounded battery at sequence switch 391. Relay 395, in attracting its outer right-hand armature, completes a circuit through the upper left-hand contact of sequence switch spring 367 (11) for the magnet of sequence switch 360, whereupon the sequence switch 360 is advanced out of position 11 and into position 18. Relay 395 releases when sequence switch 360 leaves position 11, due to the opening of its circuit at sequence switch 391 (2+11).

As soon as the sequence switch 360 passes into position 12 and until it leaves position 17, a circuit is closed through sequence switch spring 219 for energizing magnets 222 to 226, inclusive, associated with the thousands, hundreds, tens, units and start key, respectively. These magnets upon energizing restore their associated keys to normal in the manner well known in the art. As sequence switch 360 moves out of position 17, the locking circuit for relay 390 is opened at sequence switch spring 391 whereupon relay 390 releases. Relay 390 in releasing releases relays 340, 341 and 204 and completes a circuit for relay 203 over a path extending from grounded battery, through the outer left-hand normal contacts of relay 390, winding of relay 203, outer right-hand contacts of key 420, left-hand normal contacts of key 441, contacts 499 of key 404, sleeves of plug 401 and jack 100, left-hand normal contacts of relay 101, left-hand winding of relay 102 and inner left-hand contacts of relay 150 to ground. Relay 203 operates in this circuit and in attracting its upper and lower inner armatures disconnects the sender and keyboard from operative relationship with the primary test cord and connects the testing devices of the testing circuit in operative relationship therewith. Relay 203 in operating also completes an obvious circuit for lighting lamp 462. At the time that sequence switch 360 is moved into position 18, a circuit was completed through the magnet winding thereof and the lower normal contacts of relay 204 for moving sequence switch 360 out of position 18 and into position 1.

With relay 121 energized as previously described, and with sequence switch 111 in position 9, a circuit is completed for driving sequence switch 111 out of position 9 and into position 10, said circuit extending over a path from grounded battery, through the magnet winding of sequence switch 111, upper left-hand contact of sequence switch spring 117 (9), left-hand alternate contacts of relay 121, upper left-hand contact of sequence switch spring 192 (9+10) and lower left-hand contact of said spring (6¾+12) to ground. As the sequence switch 111 moves out of position 9, the circuit for relay 121 is interrupted at sequence switch spring 162 and relay 121 releases. Relay 164 is operated in positions 10 and 11 of sequence switch 111 over a path extending from grounded battery, through the winding of relay 164, upper contacts of sequence switch spring 115 (10+11), right-hand normal contacts of relay 101, and right and left-hand windings of relay 150 to ground. In position 10 of sequence switch 111, a circuit is also completed for relay 121 over a path extending from grounded battery, through the left-hand winding of relay 121, upper left-hand contact of sequence switch spring 191 (10) and lower right-hand contact of said spring (10) to ground. Relay 121 in operating locks over a path extending from grounded battery, through the right-hand winding of relay 121, upper left-hand contact of sequence switch spring 114 (10+11), inner right-hand contacts of relay 121 to ground at the contacts of relay 164.

As soon as the sequence switch 111 arrives in position 10, a circuit is completed for driving it into position 11 over a path from ground, through the magnet winding of sequence switch 111, upper left-hand contact of sequence switch spring 117 (10) left-hand alternate contacts of relay 121, upper left-hand contact of sequence switch spring 192 (9+2), and lower left-hand contact of said spring (6¾+12) to ground.

With sequence switch 111 of the test selector in position 11, and with the final selector switch in its talking position, and with the test devices of the cord circuit in operative relationship with the primary test cord, the operator is now enabled to conduct tests on the subscriber's line.

When the selector is in the testing position, the testing operator may withdraw temporarily the plug 401 from the jack 100 or may withdraw the plug 401 for the purpose of leaving the station D connected to the test desk. Removal of plug 401 releases relay 102, but lamp 166 remains lighted as previously described. Relay 102 in releasing completes an obvious circuit for relay 168. Relay 168 in operating connects relay 169 across the tip and ring conductors of the trunk now extended to station D. Assuming that the line of station D is in a serviceable condition relay 169 will operate over an obvious circuit when the receiver at station D is removed from the switchhook. Relay 169 in operating completes an obvious circuit through its outer armature and interrupter 179 for flashing lamp 178, to inform the testing operator that the party at station D is awaiting attention. The operator noting the flashing signal may insert plug 401 into jack 100 whereupon relay 102 is operated and relays 168 and 169 are released thereby opening the flashing circuit for lamp 178. The testing operator may then converse with the party at station D.

*Testing using primary cord.*

To conduct a routine test with the receiver of the called station D on the switchhook, the operator actuates the ground key 400 thereby connecting ground to the tip side of the subscriber's line over a path extending from ground, through the contacts of key 400, upper normal contacts of reverse key 411, upper normal contacts of key 402, upper normal contacts of key 403, lower inner alternate contacts of relay 203, conductor 405, contacts 498 of key 404, tip of plug 401, tip of jack 100, lower contacts of sequence switch spring 190, brush 180 and terminal 183, brush 170 and terminal 174 and thence to the tip conductor 198 of station D. The voltmeter V and batteries B and B' are then connected in series with the ring side of the line over a path extending from ground, through batteries B and B', lamp 446, left-hand normal contacts of key 450, right-hand normal contacts of keys 452 and 454, contact 482 of key 480, left-hand normal contacts of key 452, right-hand normal contacts of key 450, windings 452 and 440 of voltmeter V, normal contacts of key 430, left-hand normal contacts of key 428, contacts 484 of key 480, contacts 422 of key 420, contact 414 of key 410, contacts 412 of key 407, lower normal contacts of keys 401, 402 and 403, upper alternate contacts of relay 203, contacts 494, of key 404, ring of plug 401, ring of jack 100, upper left-hand contact of sequence switch 193 (11), brush 181 and terminal 184, brush 171, terminal 175 and thence to the ring conductor 199 of the called station D.

The operator then actuates the reverse key 411. When this key is actuated there will be a deflection of the needle of the voltmeter V. The amount of the deflection of the needle of the voltmeter is then a measure of the capacity across the line and the apparatus at the station D. When the needle comes to rest it measures in parallel the resistance between the two sides of the line and between the tip side of the line and ground, the amount of the deflection indicating whether a "short", a "ground" or the insulation resistance is being measured. If the needle comes to rest so as to give a deflection in excess of 100 volts, it indicates that the tip side of the line is probably crossed somewhere with the office battery.

The reverse key 411 is then restored to normal thereby giving a deflection of the needle of the voltmeter, such deflection being the measure of the capacity across the line and of the apparatus at station D. When the needle comes to rest it measures in parallel the resistance between the ring side of the line and ground, the amount of deflection indicating whether a "short", a "ground" or the insulation is being measured. If the needle comes to rest so as to give a deflection of 100 volts, it indicates that the ring side of the line is probably crossed with the office battery.

The operator then restores the ground key 400 to normal position. Generally, the test operator pays little attention to the reading of the voltmeter upon this movement of the key. From the foregoing it is obvious that the second and third movement of the reverse key are the important ones. If the position of the needle when in its deflected position and in its normal position are satisfactory, it indicates that the called line is in normal condition. Of all tests made on the subscriber's lines approximately 90% of the tests show the lines to be in normal condition, so that it is evident from the foregoing that the testing operator is enabled to verify this fact in a simple and rapid manner. It is also evident that if the testing operator's work is such that he can leave the ground key in its operated position only two movements of the reverse key are necessary in order to verify that a line is in normal condition. If the "at rest" position of the needle is not satisfactory further tests are made to obtain a more definite idea of the nature of the trouble. By leaving the ground key in its normal position and by operating and restoring the reverse key the testing operator is enabled to detect whether the trouble is a short circuit or a ground on the tip or ground on the ring or a combination of these troubles, by reference to his chart which shows various deflections of the needle for various kinds of trouble.

*Voltmilliammeter scale change keys.*

If the testing operator wishes to obtain some further idea of the size of the short or ground he operates the particular scale change key which connects that winding of the voltmilliammeter in circuit, most nearly in resistance, to that of the short or ground to be measured, the reading of the voltmilliammeter is most accurate when its winding is equal to that of the resistance to be measured. The scale change key 452 when operated connects the 20 volt test battery and the 0–24 volt 20,000 ohm winding comprising coils 434 to 437, inclusive, of the voltmilliammeter in circuit. The scale change key 450 when operated connects the 20 volt test battery and the 1,000 ohm winding comprising coils 436 and 437 of the voltmilliammeter in circuit. The key 480 when operated connects the 24 volt battery B″, one winding of the repeating coil 460, the supervisory relay 461 and the 0-.480 ampere winding of the voltmilliammeter in circuit.

*Measurement of foreign potentials and voltage of test batteries.*

If the testing operator wishes to obtain some definite information relating to the voltage of an external source of potential shown by the routine tests to be crossed with the subscriber's line, he operates the foreign E. M. F. key 454 and when necessary the voltmeter reverse key 428. These keys also permit the testing operator to measure earth potentials. The foreign E. M. F. key 454 when operated disconnects at its normal contacts the 100 volt and 20 volt test batteries from the voltmeter windings and instead connects thereto through its alternating contacts a ground. The voltmeter reverse key 428 when operated reverses the windings of the voltmeter with respect to the line. The reverse key must be used when the external potential is of such polarity as to cause the needle of the voltmeter to tend to deflect off the scale in a reverse direction. Because of the fact that the 0–120 volt scale of the voltmeter has a very high resistance, earth potentials can be measured with considerable accuracy even though there be a few thousand ohms resistance in the external circuit. The 20,000 ohm windings 434 to 437, inclusive, and 1,000 ohm windings 436 and 437 of the voltmeter are also available for use in making measurements of external potentials. The circuit arrangement is also such that if the voltmeter reverse key 428 only is operated, the voltage of the 100 volt test battery B and B′ is observed and if in addition the key 452 is operated the voltage of the 20 volt test battery B is observed.

*Talking, listening and monitoring test.*

If the testing operator wishes to converse with the subscriber or trouble man on the line he will operate simultaneously the key 480 and the key 410. Actuation of the key 480 and the key 410 connects one winding of the repeating coil and the supervisory relay 461 in series with the tip and ring conductors 405 and 406 of the test cord and bridges the operator's telephone set O across said conductors. Current from the source B″ then flows over the talking conductors 405 and 406 and thence over the path previously traced through the substation of the called subscriber, or the apparatus of the trouble man at said station, for the purpose of supplying talking battery thereto.

For the purpose of enabling the testing operator to monitor on the circuit, a monitoring key 407 is supplied which key, when actuated, causes the disconnection of the testing operator's transmitter circuit and the regular receiving circuit from the tip and ring talking conductors of the primary cord circuit and connects the testing operator's receiver through a high efficient monitoring repeating coil 470 thereto. Actuation of key 407 closes an obvious circuit through its outer left-hand contacts for relay 403. Actuation of key 407 also connects the secondary winding of the repeating coil 470 to the tip and ring conductors 405 and 406 of the testing operator's cord circuit. Actuation of relay 463 connects the operator's receiver 472 in operative relationship with the secondary winding of the coil 470 so that the testing operator may listen in on the line of the station D.

*Transmission test.*

Transmission tests of subscribers' lines are made before substations are put into service and in accordance with the investigation of transmission complaints, this test embodies the following features: first, the use of an adjustable artificial substation line for reducing the battery current through the transmitter on the subscriber's loop under test by a definite value which will be the same for tests on all loops and thus by equalizing battery supply losses on the different loops tested produces a fairly uniform testing condition and one which will permit of a definite loop condition being used as a basis of comparison, and second, the employment of an artificial trunk line to be connected in circuit between the trunk side of the repeating coil supplying current to the substation loop and the testing operator's talking set. The purpose of this artificial trunk is to increase the total transmission equivalent of the testing circuit to about 30 miles of standard cable thus representing the transmission to be obtained upon a typical toll or long distance connection. In addition, it is the general experience that small differences in the volume of transmission can be more readily detected where the transmission equivalent is in the neighborhood of 20 or 30 miles, and third, a talking test between the testing operator and the installer and trouble man at the substation.

For equalizing the current supply to the different substations a variable resistance rheostat is provided which has three dials. By the rotation of the dial handle 466, resistance from 0 to 50 ohms may be connected into the circuit by approximately 2½ ohm steps. By the rotation of the dial handle 467, resistance from 0 to 500 ohms may be connected into circuit by 25 ohm steps. In order to increase the range of the rheostat when used for the purposes as described later, a third dial handle 468 is provided by means of which an additional 2,500 ohm winding may be connected in circuit by 500 ohm steps. The rheostat is normally disconnected from but may be connected in the primary test circuit by a key 430.

When making a transmission test the operator actuates key 490 thereby connecting the testing operator's telephone set O through contacts 492 and 493 of the key to the artificial cable 495 which is in turn connected to the lower windings of the repeating coil 460. Key 480 is then actuated to connect the primary winding of coil 460 in circuit with station D. The testing operator then actuates key 430 and adjusts the rheostat until the needle indicates that .040 amperes is flowing out over the subscriber's loop which it is assumed in this case corresponds to a standard loop. By building up a substation loop in this manner and by introducing the artificial cable, the transmission takes place over the circuit approximating 30 miles of standard cable.

After one or more tests on the line to be tested have been made using the primary test circuit, the testing operator may associate the secondary test circuit with the line to be tested by actuating the interchange key 404 or by releasing the test connector and building up a new connection with the secondary test cord. The release of the test selector will be described hereafter.

*Tests using secondary test cord.*

When the operator conducts the special test hereinbefore mentioned, the secondary test plug 431 is employed. After inserting the test plug 431 into the jack such as 100 of a selector circuit, the operator will record the number desired on the keyboard and actuate the start key 205. Assuming that the number 9532 is being called over the secondary cord, relays 207 to 210, inclusive, will be operated as previously described. Insertion of plug 431 into the jack 100 completes a circuit over a path extending from ground, through the right and left-hand windings of relay 102, left-hand normal contacts of relay 101, sleeves of jack 100 and plug 431, lowermost normal contacts of key 404, outer left-hand normal contacts of key 505, winding of relay 253, outer left-hand normal contacts of relay 397 to grounded battery. Relay 102 operates in this circuit and completes an obvious circuit through its left-hand contacts for lamp 166. Lamp 166 in lighting indicates that the selected trunk circuit is busy. The relay 253 is of the marginal type and does not operate in series with the right-hand high resistance winding of relay 102. Insertion of plug 431 into jack 100 also closes a circuit for relay 350 over a path extending from ground, through the inner right-hand contacts of relay 395, right-hand normal contacts of relay 310, winding of stepping relay 371, upper right-hand contact of sequence switch spring 396 (1+2), lower left-hand contact of said spring (1+11), inner right contacts of relay 390, upper contact of sequence switch spring 351 (1+2), winding of relay 350, inner lower normal contacts of relay 253, contacts 486 of key 404, tip of plug 431 and thence to grounded battery through the left-hand winding of line relay 121 over the path previously traced. Relay 350 operates in this circuit but relay 121 being of the marginal type does not operate in series with the winding of relay 350. Relay 350 in operating completes a circuit for relay 397 over a path extending from grounded battery, through the lower contact of sequence switch spring 391 (1+17), winding of relay 397, contacts of relay 350, normal contacts of relay 399, inner left-hand contacts of relay 207, contacts of key 205 and left-hand contacts of sequence switch spring 290 (1) to ground. Relay 397 in operating locks through its outer left-hand contacts to ground at the outer right-hand contacts of relay 390. Relay 350 in operating also completes a circuit for relay 204 over a path extending from grounded battery, through the winding of relay 204, contacts of relay 350 and thence to ground over the path just traced. Lamp 352 also lights over a path extending from grounded battery, through lamp 352, contacts of relay 350 and thence to ground at the contacts of sequence switch spring 290 over the path just traced. The lighting of lamp 352 indicates that the sender will be associated with the secondary test cord. The function of relay 204 in operating will be described hereafter. Relay 397 in attracting its outer right-hand armature, disconnects grounded battery from the relay 253 and connects grounded battery to the relay 355. Ground is now connected to the other end of the winding of relay 355 through the windings of relay 102 over the path previously traced. Relay 355 operates in this circuit. When relay 204 operated as previously described, a circuit was completed for moving sequence switch 360 out of position 1 and into position 2 over the path previously traced and described in connection with the primary test plug.

With sequence switch 360 in position 2, the sender pilot lamp 382 is flashed by the interrupter 281 over the path previously traced. This lamp continues flashing during the time that the sender is connected to the secondary test cord. When sequence switch 360 has reached position 2, the winding of relay 350 is short circuited at the contacts of sequence switch spring 351 whereupon the resistance in series with the stepping relay 371 and the line relay 121 is reduced so that these relays become energized in the fundamental circuit. The remaining operations in the circuits for placing the testing devices of the test circuit in operative relationship with the called line and for disconnecting the sender from the secondary test cord are similar to that previously described in connection with the primary test cord and it is believed that a further detailed description of such operations is unnecessary. It will be noted that when the sequence switch 111 leaves position 9, sequence switch 360 is advanced out of position 11 and into position 18. As sequence switch 360 moves out of position 17 the locking circuit for relay 397 is opened whereupon a circuit for relay 253 is completed. Relay 253 in operating completes an obvious circuit for lamp 462.

Howler test.

If the party at the station D has intentionally or otherwise left the receiver off the switchhook and the testing operator desires to attract the attention of the party thereat for the purpose of enabling the party to restore the receiver to the switchhook, a howler tone is connected to the subscriber's line. Assuming that an indication has been given at the central office, that the receiver at station D is off the switchhook and that the testing operator has set up a connection with the station D by means of the secondary test plug 431, the testing operator will next actuate the howler key 491. With key 491 actuated a circuit is completed for relay 500 of the secondary test cord over a path extending from grounded battery, through the upper left-hand winding of repeating coil 501, winding of relay 500, left-hand normal contacts of keys 502 and 503, inner left-hand normal contacts of key 505, lower normal contacts of key 507, lower normal contacts of keys 508 and 509, lowermost contacts of relay 580, lower normal contacts of key 581, upper alternate contacts of relay 253, contacts 484 of key 404, rings of plug 431 and jack 100, upper left-hand contact of sequence switch spring 193 (11), brush 181, terminal 184, brush 171, terminal 175, conductor 199, thence through the loop of substation D, conductor 198, terminal 174 and brush 170, terminal 183 and brush 180, lower right-hand contact of sequence switch spring 190 (8+11), lower left-hand contact of said spring (11), tips of jack 100 and plug 431, contacts of key 404, lower inner alternate contacts of relay 253, upper normal contacts of key 581, uppermost normal contacts of relay 580, upper normal contacts of keys 509, 508 and 507, right-hand normal contacts of keys 505, 503 and 502 and upper right-hand winding of repeating coil 501 to ground. Relay 500 in operating completes a circuit for operating relay 530 and for lighting lamp 537 over a path extending from grounded battery, through the winding of relay 530 and lamp 537 in parallel and through the lowermost contacts of relay 253 to ground. Lamp 531 remains lighted as long as the receiver at station D is off the hook.

Relay 530, in operating, completes a circuit for relay 531 over a path extending from grounded battery, through the winding of relay 531, alternate contacts of relay 530, brush 584 of switch 560 and the last position contact associated therewith, and lowermost contacts of key 491 to ground. Relay 531 in operating locks over a path extending from grounded battery, through the winding of relay 531, contacts 447 of key 491 and thence to ground at the outer right-hand contacts of relay 531. Relay 531, in operating, also completes a circuit for stepping magnet 588 over a path extending from grounded battery, through the winding of magnet 588, outer left-hand contacts of relay 531, brush 585 of switch 560 and the last position contact associated therewith, left-hand contacts of relay 559, and interrupter 555 to ground. Under control of interrupter 555, the brushes of switch 560 are stepped out of their first and into their second positions. The closure of the inner left-hand contacts of relay 531 completes a circuit for closing the primary circuit of coil 534 over a path extending from grounded battery, through the right-hand winding of coil 534, outer right-hand contacts of relay 559, inner left-hand alternate contacts of relay 531, left-hand contacts of relay 536 and interrupter 535 to grounded battery. The closure of the primary circuit of coil 534 causes a tone to be induced into the secondary coil thereof. One or more secondary windings of coil 534 are bridged across the tip and ring conductors of the test circuit when the howler key 491 is actuated. The bridged circuit includes brush 584 and contacts thereof. When the brushes of switch 560 are moved into their second position contacts, the uppermost coil of the secondary winding of coil 534 is bridged across the tip and ring conductors of the test circuit. As the brush 584 is moved into successive positions, an increasing number of secondary windings are bridged across the test circuit, until the middle position of the switch 560 is reached. When the middle position is reached the secondary circuit of coil 534 is opened. Upon the next step the uppermost winding is again connected in the secondary and as the brushes are stepped to normal an increasing number of secondary windings are again connected in. As soon as the brush 585 arrives at its second position contact, stepping magnet 588 is energized under control of interrupter 555 over obvious circuits causing the advancement of the brushes through a complete revolution. When contact 549 of the switch 560 is reached by brush 583 during the first half of a revolution, relay 573 is operated over a circuit extending from grounded battery, through the winding of relay 573, normal contacts of relay 574, contact 549 and brush 583 to ground. On the second half of the revolution of the brushes, relay 574 is operated in series with relay 573 over a path extending from grounded battery, through the winding of relay 573, winding of relay 574, contacts of relay 573, and outer right-hand alternate contacts of relay 531 to ground. When the brush 583 moves into engagement with contact 549 on the second half of the revolution, relay 559 operates over a path extending from grounded battery, through the winding of relay 559, alternate contacts of relay 574, contact 549 and brush 583 to ground. Relay 559 in operating locks through its inner right-hand contacts to ground at the outer right-hand contacts of relay 531. Relay 559, in attracting its outer right-hand armature, opens the primary circuit of the coil 534 and in attracting its left-hand armature disconnects the interrupter 535 from the brush 585. The tone is thereby received from the called line. Restoration of key 491 to normal restores all operable howler apparatus to normal.

*Ringing tests—adjusting subscribers' bells.*

To conduct a ringing test on the station D, the operator will first establish a connection with the secondary test cord at the station D in the manner previously described and then actuate the ringing key 509. The actuation of key 509 connects ground through contact 550 of key 509 to the tip conductor of the secondary test plug 431 and alternating current at the source 554 through relay 533 and contacts 551 of key 509 to the ringing conductor of the secondary test plug 431 over obvious circuits. Current from the source 554 traversing the called line will cause the bell at the station D to be actuated. The actuation of key 509 also completes a circuit as follows: from ground, through the lowermost contacts of relay 253, uppermost contacts of key 509 and thence in parallel, one path extending through the winding of relay 580 to grounded battery, the other path extending through the inner lower contacts of relay 580 and the contacts of relay 533 to grounded battery. Relay 580 does not operate in this circuit due to the shunt around its winding through its inner lower contacts. When the party at station D removes the receiver from the switchhook, sufficient current flows through the winding of relay 533 to energize said relay 533. Relay 533 in operating, removes the shunt around the winding of relay 580 whereupon said relay 580 operates. Relay 580 in operating, disconnects ringing current from the station D and extends the ring talking conductor of the secondary test cord through to the grounded battery at the upper windings of repeating coil 501. Relay 580 in attracting its upper inner contacts completes an obvious circuit for lamp 541. Lamp 541 lights in this circuit indicating to the testing operator that the party at station D has answered. If the bell at station D is being tested, the trouble man thereat will test the bell until a proper ring is received after which he will inform the testing operator thereof. The testing operator will then restore the ringing key to normal position causing the restoration of all ringing apparatus to normal.

*Dial test.*

If the testing operator desires to test the dial at the station D, key 581 will be actuated whereupon ground will be connected to the tip conductor of the secondary test plug 431 and through the secondary winding of the induction coil 561, and grounded battery will be connected to the ring conductor of the test plug 431 through the left-hand winding of relay 562. Connected to the primary of coil 561 is a source of dial tone which is induced into the secondary of coil 561 and traverses the connection to the party at station D. This dial tone is for the purpose of indicating that the dial testing apparatus is connected to the line. Relay 562 corresponds to the pulsing relay of a selector switch and relay 564 to the well known slow-to-release relay controlled by the pulsing relay. After the key 581 is actuated, the testing operator may inform the party at station D that the dial 195 may be actuated or the party at station D may start dialing as soon as the tone is received. As the dial returns to normal position, relay 562 will be intermittently deenergized causing the dial testing apparatus 563 to function in the manner fully described in the aforementioned patent to Gent. Upon the completion of the dial test, the testing operator may restore key 513 to normal and proceed to conduct any other test which it is desired to make on the line.

*Testing with primary and secondary cords.*

In cases where two lines are crossed with each other both the primary and secondary cords may be employed to locate the trouble. Again the testing operator may successively place the primary and secondary cords into the jacks of a pair of trunks (it being understood of course that a plurality of test trunks terminate in jacks at the test desks) for the purpose of conducting routine tests in one line and at the same time that he is conducting special tests in the other. In such cases the sender is invariably first associated with the primary test cord because the insertion of the primary plug into the jack 100 of a trunk and actuation of the key 205 operates relays 399 and 390 associated with the primary cord. With these relays operated the corresponding relays 350 and 397, associated with the secondary cord, cannot operate, due to the circuit for relay 350 being open at the inner right-hand contacts of relay 390. As soon, however, as the sender has completed its function with the primary cord, the key 205 may again be actuated to place the sender in operative relationship with the secondary cord. If on the contrary, the secondary cord and the primary cord are successively connected to jacks of trunk lines and the key 205 is actuated the sender will be invariably placed first in operative relationship with the secondary cord.

From the foregoing description it will be obvious how the operator may successively connect the sender to test cords when they are connected to jacks leading to different selectors by the actuation of a single key. The first actuation of the key connects the sender to the test cord first taken for use and the second actuation to the one next taken for use.

*Restoration of apparatus to normal position.*

After the desired tests have been completed the testing operator will remove plug 401 or 431 from the jack 100 whereupon relay 203, associated with the primary test cord or relay 253 associated with the secondary test cord as the case may be, and relay 102 associated with the test selector will release due to the interruption of their circuits at the sleeve contacts of plug 401 or plug 431 and jack 100. The operator thereupon actuates the disconnect key 130. The actuation of key 130 completes an obvious circuit for relay 101. Relay 101 in attracting its right-hand armature opens the circuit for relays 150 and 164 whereupon they release. Relay 150 in releasing extinguishes lamp 166. Relay 164 in retracting its armature opens the holding circuit for relay 121. Relay 121 then retracts its armatures and completes a circuit for sequence switch 111 over a path extending from grounded battery, through the magnet winding of sequence switch 111, upper right-hand contact of sequence switch spring 113 (11+17) and outer right-hand contacts of relay 121 to ground, for driving sequence switch 111 out of position 11 and into position 17. Under control of its master cam 189 sequence switch 111 is driven out of position 17 and into position 18.

In position 18 of sequence switch 111, a circuit is completed from grounded battery, through the winding of down drive magnet 158 and the lower contact of sequence switch spring 162 (18) to ground. The selector brushes are returned to their normal position under the control of magnet 158 and when the normal position is reached, a circuit is completed from ground, through the lower right-hand contact of sequence switch spring 118 (7+5), brush 145, normal commutator segment 131, lower left-hand contact of sequence switch spring 113 (3+18), and the magnet winding of sequence switch 111 to grounded battery, for moving sequence switch 111 out of position 18 and into position 1.

As soon as sequence switch 111 leaves position 12, the ground which has been holding the final selector in its operated position is removed at sequence switch spring 192 and the final selector is restored to normal in the manner fully described in the aforementioned Stearn et al patent.

If the testing operator desires to disconnect or abandon a call before selection of the called line is completed, he will remove the test plug from the jack and then actuate the disconnect key 130. Removal of plug 401 or 431 releases relay 341 or 355 depending on which plug is employed, thereby completing an obvious circuit for relay 344 including contacts of relays 341 and 355 and the contact of sequence switch spring 365. Relay 344 in operating locks to ground at sequence switch spring 366. Relay 344 in attracting its left-hand armature completes an obvious circuit for driving the sequence switch 360 to normal. The removal of the plug from jack 100 also releases relay 102 which in retracting its inner right-hand armature shunts the left-hand high winding of relay 150, thereby permitting relay 151 to operate over an obvious circuit. Relay 151 in operating locks to ground at sequence switch spring 162 and completes an obvious circuit for driving sequence switch 111 to position 17, whence it is returned to position 1, thereby restoring all apparatus at the selector switch to normal position.

What is claimed is:

1. In a testing system for testing subscribers' lines, a circuit terminating in primary and secondary cords, means including machine switching mechanism for extending one of said cords to any one of said lines, a sender for controlling said machine switching mechanism, and an operator controlled single throw switch common to said primary and said secondary cords for actuating said sender to complete said extension over either cord.

2. In a testing system for testing subscribers' lines, a circuit terminating in primary and secondary cords, means including machine switching mechanism for extending one of said cords to any one of said lines, a sender for controlling said machine switching mechanism, and a key operable in one direction only common to said primary and secondary cords for actuating said sender to complete said extension over the cord taken for use.

3. In a testing system for testing subscribers' lines, a testing circuit terminating in a primary and secondary cord arranged for association with lines through machine switching mechanism in accordance with the kind of test to be made, means including a sender for actuating said machine switching mechanism to extend one of said cords to any one of said lines, a key for said test circuit operable in one direction only common to said primary and said secondary cords, and means operative in response to the actuation of said key to actuate said sender to complete said extension over the cord taken for use.

4. In a testing system for testing a subscriber's line, a circuit terminating in a primary and a secondary cord, and having testing devices associated therewith for testing said line, machine switching mechanism, a variably operable operator's keyboard for cooperation with an automatically progressive sender for setting said switching mechanism on any one of said lines, a key operable in one direction only common to said primary and said secondary cords, means to associate either cord with said switching mechanism and means operative in response to the actuation of said key for actuating said sender.

5. In a testing system for testing a subscriber's line, a testing circuit terminating in a primary and secondary cord, a train of automatic switches, an automatically progressive sender common to said cords for setting said switches, a key operable in one direction only common to said cords, and means operating in response to the actuation of said key and the connection of one of said cords to the first switch of the train for actuating said sender to set said switches.

6. In a testing system for testing a subscriber's line, a testing circuit terminating in a primary and secondary cord, testing devices therein, a train of automatic switches, a sender common to said cords for setting said switches, a key common to said cords, means operating in response to the actuation of said key and the connection of one of said cords to the first switch of the train for connecting the sender in operative relationship with said switches, and means operative when the last switch of the train is set for disconnecting said sender from said switch and for placing said testing devices in operative relationship with said subscriber's line.

7. In a testing system for testing a subscriber's line, a testing circuit terminating in a primary and secondary cord, a train of automatic switches, a sender common to said cords for setting said switches, a key common to said cords, means operating in response to the actuation of said key and the connection of one of said cords to the first switch of the train for connecting the sender in operative relationship with said switches, means operative when the last switch of the train has been set for automatically disconnecting said sender from operative relationship with said switches, a signal, and means for actuating said signal in one manner during the time sender is connected to the switches and in another manner after the sender is disconnected and until the connection is released.

8. In a testing system, a circuit terminating at each end in a plug, a switch controlling device, a key for said circuit common to said plugs, and means controlled by the actuation of said key for always connecting said switch controlling device to a certain one of said plugs if both plugs are in use when the key is actuated.

9. In a testing system for testing subscribers' lines, a pair of trunk circuits each terminating in an automatic switch for connecting with a pair of said lines, an impulse sender for setting said switches, a test circuit terminating in a primary and a secondary cord, means for connecting said primary cord to one of said trunk circuits and said secondary cord to the other of said trunk circuits, a key common to said primary and said secondary cords, and means controlled by said key when both cords are in use for connecting said sender to a certain one of said cords.

10. In a testing system, a circuit, means for extending said circuit over one end thereof, means for extending said circuit over the other end thereof, a sender, means for invariably connecting the sender to the end of the circuit first extended, and means for thereafter connecting the sender to the other end of the circuit.

11. In a testing system, a circuit terminating at each end in a manual connection terminal, a pair of manual connection terminals arranged to be connected to by the terminals at the ends of said cords, a switch controlling device, a key common to the manual connection terminals of said circuit, and means operative in response to the connection of the terminals of the circuit with the second mentioned terminals and the actuation of said key for invariably connecting said device to the end of the circuit first taken for use.

In witness whereof, I hereunto subscribe my name this 4th day of January A. D., 1923.

ERIC R. LUNDIUS.